US005156659A

United States Patent [19]

Wright

[11] Patent Number: 5,156,659

[45] Date of Patent: Oct. 20, 1992

[54] COOLER AND PARTICULATE SEPARATOR FOR AN OFF-GAS STACK

[76] Inventor: George T. Wright, 15 Cherry Hills Dr., Aiken, S.C. 29803

[21] Appl. No.: 681,292

[22] Filed: Apr. 8, 1991

[51] Int. Cl.[5] .............. B01D 47/00

[52] U.S. Cl. .............. 55/220; 261/79.2; 261/116; 261/DIG. 9; 110/119; 110/215

[58] Field of Search .............. 261/DIG. 9, 16, 17, 261/79.2, 116; 110/119, 215, 184; 98/48; 55/220

[56] References Cited

U.S. PATENT DOCUMENTS

| | | | |
|---|---|---|---|
| 155,465 | 9/1874 | Rumely | 261/DIG. 9 |
| 917,561 | 4/1909 | Double | 261/DIG. 9 |
| 2,688,943 | 9/1954 | Wickland | 261/116 |
| 2,873,919 | 2/1959 | Behre et al. | 241/23 |
| 3,495,384 | 2/1970 | Alliger | 261/DIG. 9 |
| 3,660,465 | 5/1972 | Gladu | 261/118 |
| 3,789,628 | 2/1974 | Mahoney | 65/27 |
| 3,904,376 | 9/1975 | Kawata | 261/DIG. 9 |
| 4,157,244 | 6/1979 | Gernhardt et al. | 261/17 |
| 4,444,697 | 4/1984 | Gater et al. | 261/118 |
| 4,649,807 | 3/1987 | Aasen et al. | 98/58 |
| 4,675,041 | 6/1987 | Tsai | 65/27 |
| 4,789,390 | 12/1988 | Kunkle et al. | 65/27 |
| 4,936,871 | 6/1990 | Wilmer et al. | 55/84 |

*Primary Examiner*—Bernard Nozick

*Attorney, Agent, or Firm*—Harold M. Dixon; William R. Moser; Richard E. Constant

[57] ABSTRACT

An off-gas stack for a melter comprising an air conduit leading to two sets of holes, one set injecting air into the off-gas stack near the melter plenum and the second set injecting air downstream of the first set. The first set injects air at a compound angle, having both downward and tangential components, to create a reverse vortex flow, counter to the direction of flow of gas through the stack and also along the periphery of the stack interior surface. Air from the first set of holes pervents recirculation zones from forming and the attendant accumulation of particulate deposits on the wall of the stack and will also return to the plenum any particulate swept up in the gas entering the stack. The second set of holes injects air in the same direction as the gas in the stack to compensate for the pressure drop and to prevent the concentration of condensate in the stack. A set of sprayers, receiving water from a second conduit, is located downstream of the second set of holes and sprays water into the gas to further cool it.

8 Claims, 2 Drawing Sheets

Fig. 3
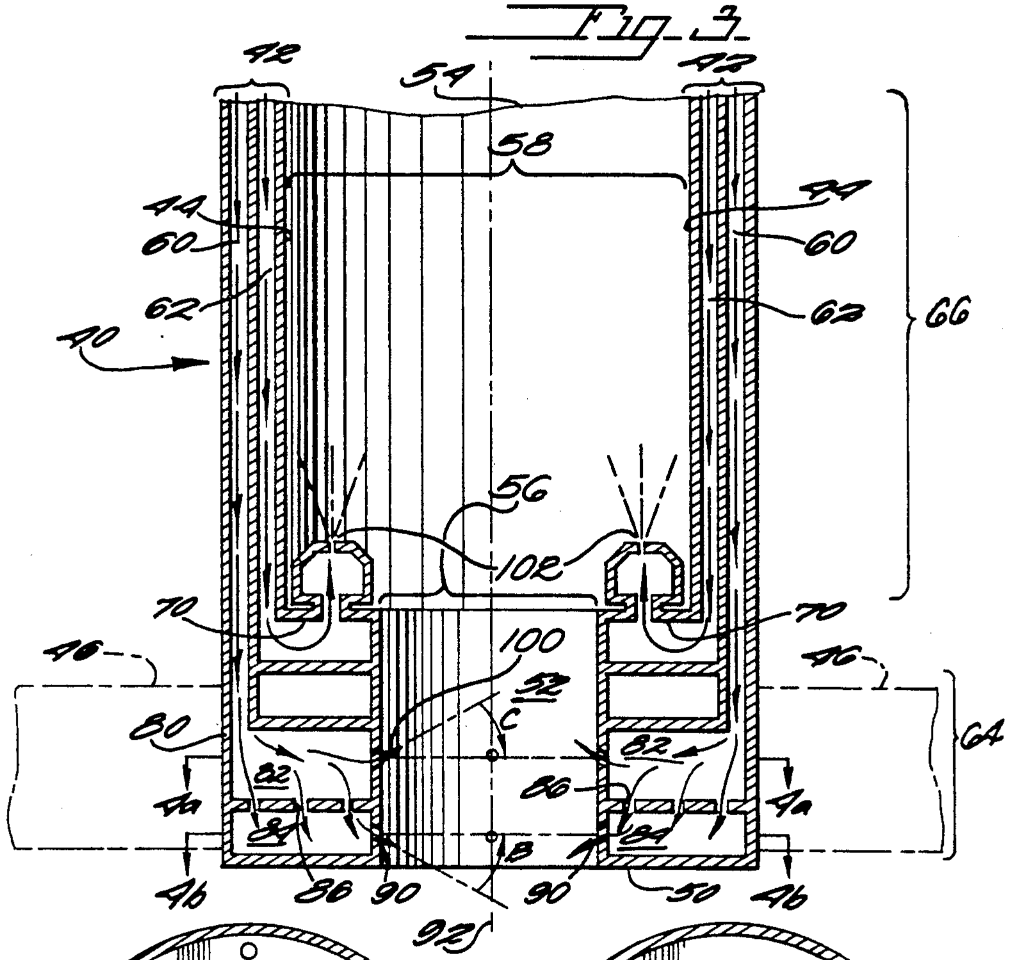
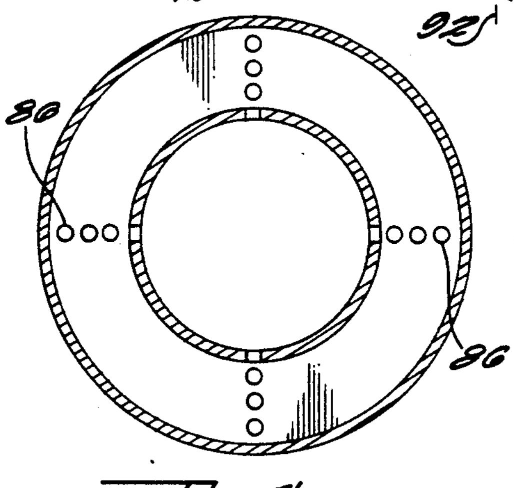
Fig. 4a
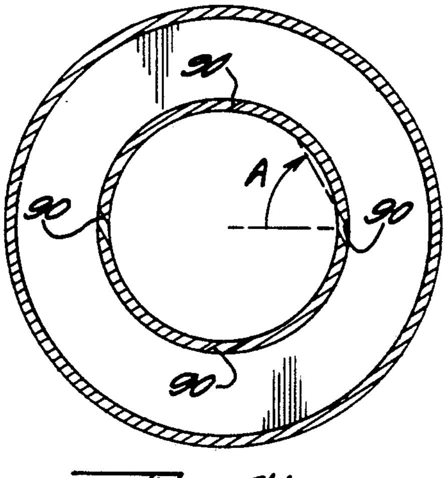
Fig. 4b

COOLER AND PARTICULATE SEPARATOR FOR AN OFF-GAS STACK

BACKGROUND OF THE INVENTION

1. Field of the Invention

The present invention relates generally to off-gas stacks of furnaces, melters and reaction vessels. More specifically, the present invention relates to methods and apparatus for cooling off-gas stacks and preventing particulate from exiting the off-gas stack of a furnace, melter or reaction vessel.

2. Discussion of Background

A furnace, melter or reaction vessel generally comprises a vessel having a lower portion with means for heating material, an upper portion or "plenum" with a device for adding feed materials, and an off-gas stack. Various gases and vapors plus heat will exit the plenum through the off-gas stack. If the feed is injected in the form of particles into the vessel or because of reactions taking place within the vessel, smaller particles of feed and reactants may be swept up into the stack before reaching the melt.

When air and gases flow from the relatively larger volume of the plenum to the smaller volume of the off-gas stack, recirculating currents are established near the inside wall of the stack near its entrance. Particles entrained in these recirculating currents tend to stick to the stack wall, to accumulate there, and to restrict gas flow. The attached particulate can obstruct flow as well as cause corrosion of the stack wall in time. The smallest particulate, however, will be swept through and out of the stack.

Also, the wall at the stack entrance will be at a relatively higher temperature than the downstream portions of the stack wall since the air and gas flow will be hotter upon leaving the plenum and cooler as it moves up the stack. Therefore, the stack entrance will see more thermal stresses than the down stream portions.

There is a need for a means for preventing particulate from attaching to the stack wall and for cooling the stack wall.

SUMMARY OF THE INVENTION

According to its major aspects, the present invention is method and apparatus for use in a furnace, melter or reaction vessel having an off-gas stack for venting gas. The apparatus comprises a first means for directing a flow of a fluid, such as air, into the stack in a direction opposite that of the exiting flow of gas and tangential to the interior surface of the stack in order to create a vortex. The temperature of the fluid is lower than the temperature of the gas to cool the surface of the stack. Preferably, there is a second means for directing a flow of a fluid, such as air, in the same direction as the flow of gas in the stack to overcome momentum loss due to the action of the vortex. This second flow of air compensates for the pressure drop in the stack caused by the first flow, namely the reverse, vortical air flow. Also, preferably, there is a means for spraying another fluid, such as water, into the stack downstream, after the second directing means, in order to cool the gas. This spraying means is positioned to spray the fluid in the direction of the flow of the gas.

The first and second directing means are preferably sets of holes oriented to achieve the desired air flow. The spraying means is preferably a set of nozzles.

The first directing means, a first set of holes, is a feature of the present invention. By boring a set of holes through the wall of the off gas stack at an appropriate angle and near the plenum, a vortex of air can be created by forcing air to flow through the holes that will prevent the recirculation zone from forming and thus prevent the deposit of particulate on the interior surface of the stack. If the flow is sufficiently great, particulate will be forced back into the plenum. The flow of air at a temperature lower than that of the gas, cools the interior surface of the stack at the point where it experiences the highest temperatures. The holes are each bored at an angle with respect to the radius of the stack and at an angle with respect to the plane of that radius so that they direct the flow both toward the plenum, the reverse of the direction of flow of the gas, and tangentially to the interior surface of the stack.

Another feature of the present invention is the second set of holes which are bored in the direction of the gas flow to compensate for the pressure drop caused by the first set of holes. This second set also helps to distribute condensate from the cooling gas so that it does not build up in one location of the stack wall.

Yet another feature of the present invention are the sprayers. Preferably, the off-gas stack has a portion having a smaller diameter at the end near the plenum and a portion having a larger diameter at the other end. Where the two portions meet is a flange connecting the two portions. On the flange, oriented to direct the spray in the direction of the flow of the gas, the set of spray nozzles. The spray, as well as the expanded diameter of the stack, helps to cool the vented gas.

These and other features and advantages will be apparent to those skilled in the art from a careful reading of the Detailed Description of a Preferred Embodiment of the present invention accompanied by the drawings.

BRIEF DESCRIPTION OF THE DRAWINGS

In the figures,

FIG. 3 shows an off gas stack according to a preferred embodiment of the present invention;

FIG. 4*a* shows a cross section of FIG. 3 along lines 4*a*–4*a*; and FIG. 4*b* shows a cross section of FIG. 3 along lines 4*b*–4*b*.

DETAILED DESCRIPTION OF A PREFERRED EMBODIMENT

The present invention is an off-gas stack of a melter, furnace or reaction vessel and a method for both cooling the stack and returning to the plenum particulate entrained in the gas entering the stack.

Figure 1:
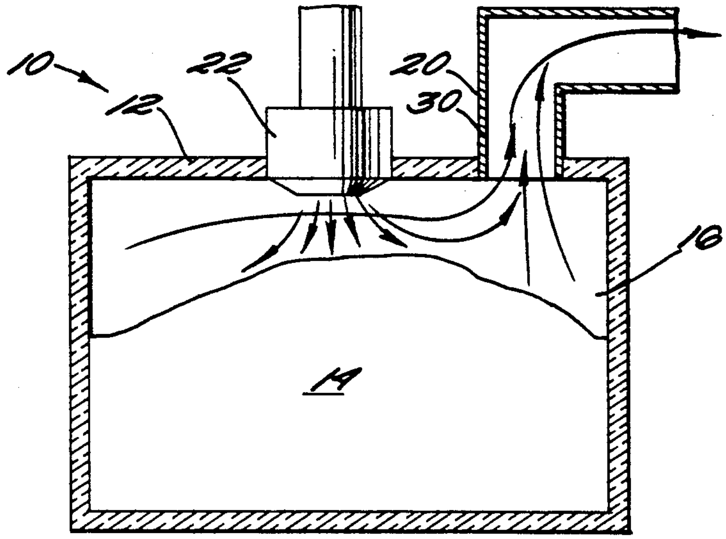
FIG. 1 illustrates in cross section a typical melter or furnace.

Referring now to FIG. 1, there is shown in cross section a typical melter 10. Melter 10 has a wall 12 and may have external or internal heaters (not shown) for heating the material 14 in the lower portion of melter 10. In the upper portion or plenum 16, above material 14 are gases and vapors that eventually find their way to an off gas stack 20 where they are vented from plenum 16.

A source of feed 22 is located in the top of plenum 16 for injecting fresh material into melter 10. If source 22 injects feed in the form of a slurry or dry particulate, the finer particulate, and certainly the carrying liquid of the slurry, may find its way to stack 20 directly without reaching the balance of the material 14 in the lower portion of melter 10.

Figure 2A:
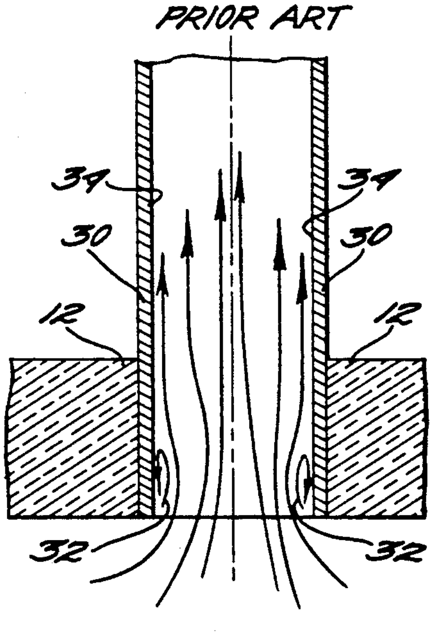
FIG. 2*a* shows a detail of a prior art off gas stack with the air flow lines indicated.
Figure 2B:
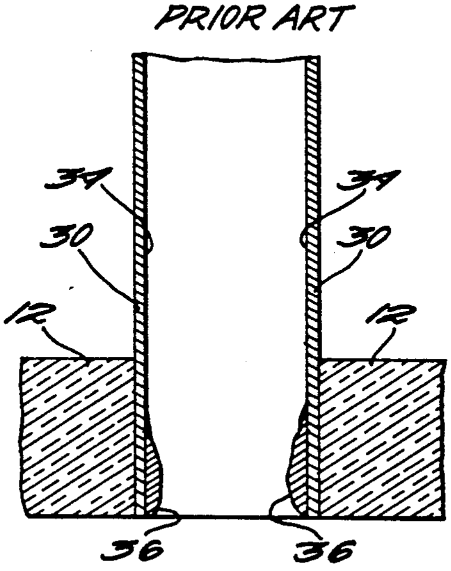
FIG. 2*b* shows the prior art off gas stack of FIG. 2*a* with deposits of particulate on the interior surface.

FIGS. 2*a* and 2*b* show a detailed view of stack 20. Stack 20 has a wall 30 attached to wall 12 of melter 10. As gas and vapors leave plenum 16 they go from an unconfined volume in plenum 16 to a relatively confined volume in stack 20, as suggested in FIG. 2*a* by flow lines. Near wall 30, however, recirculation zones 32 are created by the friction of the gas flowing near the interior surface 34 of stack 20. As shown in FIG. 2*b*, surface 34 near recirculation zones 32 will become a site for deposit of particulate 36. The accumulation of particulate 36 restricts flow into stack 20 and also contributes to the degradation of wall 30 since particulate 36 may be corrosive.

Also, since the temperature of the gas decreases from that in plenum 16 to that at the far end of stack 20, greater thermal stresses are found near the entrance to stack 20.

FIG. 3 illustrates a preferred embodiment of a stack 40 according to the present invention. Stack 40 is essentially a pipe having a wall 42 with an interior surface 44 and attached to a wall 46 of a melter. Stack 40 has a plenum end 50 in communication with the plenum 52 of the melter and a second, opposing end 54. Stack 40 has two concentric conduits, a first conduit 60 for carrying a fluid such as air and a second conduit 62 for carrying another fluid such as water.

Stack 40 is divided into a first portion 64 toward plenum end 50 and having a first diameter 56 and a second portion 66 towards second end and having a second diameter 58. As will be clear from FIG. 3, second diameter is larger than first diameter. Where first portion 64 and second portion 66 meet is a flange 70.

As will be seen from FIGS. 4, 4*a* and 4*b*, air (or other compatible, cooling fluid) follows first conduit 60 to an expanded portion 80 which has an upper chamber 82 and a lower chamber 84. Upper chamber communicates with lower chamber through a series of ports 86 that allow the distribution of air received from first conduit 60 evenly between upper and lower chambers 82, 84.

Air from lower chamber 84 exits through holes 90 into first portion 64 of stack 40 at an angle that creates a reverse, vortical flow. Holes 90 are preferably positioned as near to plenum as possible, preferably a distance equal to about 0.05 times the diameter of stack 40. The angle of holes 90 is a compound angle, that is, both at an angle A with respect to the radius from the centerline 92 of stack 40 and at an angle B with respect to the plane of that radius. Specifically, angle A is to impart a flow that is tangential to the circumference of interior surface 44 and angle B imparts a reverse or counter flow, that is, in the direction opposite that of the flow of gas from plenum 52 through stack 40. Typically angle A is approximately 45° and angle B may range from 20° to 30°. Air flowing through holes 90, even minimal air flow, will prevent the recirculation zone (FIG. 2*a*) from forming and will mitigate the attachment of particulate to the interior surface 44 of wall 42. Increased air flow through holes 90 will cause the finer particulate swept up into stack 40 by the hot rising gas from plenum 52 to be returned to plenum 52 rather than travel further up stack 40.

The air from upper chamber 82 also enters second portion 66 of stack 40 directly through holes 100 which are oriented at an angle C, typically approximately 25°, to force air in the same direction as the flow of gas rising in stack 40. Holes 100, being downstream of holes 90, act as eductor jets and compensate for the pressure drop caused by the reverse flow of air from holes 90. Air injected by holes 100 also speed up delivery and cooling of gas, causing the more even distribution of condensate on the interior surface 44 of wall 42 so that condensate is not concentrated upstream.

Mounted on flange 70, in first portion 64 of stack 40 are a set of nozzles 102 which receive water or other cooling fluid from second conduit 62 and spray the water in the direction of the moving gas. The expansion of stack from second portion to first and the spray of water from nozzles 102 further cools gas on exit from plenum 52.

The number of holes 90 and holes 100 will depend on their size and the air flow rate and the size of stack 40, the flow rate of the gas vented therethrough. The number of each should be sufficient for the purpose of each. In the case of holes 90, there should be at least enough air forced through to create a vortex of air about the periphery of stack 40 and preferably additional air for penetrating into the stack gas to cause at least some entrained particulate to return to plenum 52. Too much air will interfere with the venting. Typically, the reverse flow is 0.05 to 0.30 of the total mass flow through the conduit and the velocity of the reverse jets is ten times or more greater than the velocity of the flow through the pipe.

Holes 100 should be spaced far enough from holes 90 to avoid interfering with the vortex but close enough to provide effective compensation for the pressure drop cause by air flow through holes 90 and to keep the gas moving toward second end 54 of stack 40.

It will be apparent to those skilled in the art from the foregoing description of a preferred embodiment that many changes and substitutions can be made in the embodiment described without departing in spirit and scope from the invention, which is to be defined by the following claims.

What is claimed is:

1. Apparatus for use in a melter having a hollow off-gas stack for venting off-gas from said melter, the interior of said off-gas stack being in fluid communication with the interior of said melter and having an entrance adjacent to said melter, said gas flowing from said melter into said entrance and continuing through said stack, said stack having an interior surface and a radius, further comprising:

first means for directing a flow of a first fluid into said entrance of said stack in a direction opposing the flow of said off-gas, said first fluid being at a temperature lower than the temperature of said off-gas, said first directing means directing said first fluid toward said interior of said melter and tangentially with respect to said radius of said stack; and second means for directing a flow of a second fluid into said stack in a direction concurrent with the flow of said off-gas in said stack, said first directing means positioned between said entrance and said second directing means.

2. The apparatus as recited in claim 1, wherein said apparatus further comprises means for spraying a liquid into said stack in a direction concurrent with the flow of said off-gas in said stack, said second directing means positioned between said spraying means and said first directing means.

3. The apparatus as recited in claim 1, wherein said stack has a wall and said first directing means further comprises a first conduit concentric to said stack and having a plurality of holes formed in said wall of said stack so that the interior of said first conduit communicates with said interior of said stack.

4. The apparatus as recited in claim 1, wherein said stack is circular and said first directing means is located near said entrance to said stack, said distance being approximately equal to 0.05 the diameter of said stack.

5. The apparatus as recited in claim 1, wherein said stack has a radius and said first directing means directs said first fluid toward said interior of said melter at an angle with respect to said radius, said angle ranging from 20° to 30°.

6. The apparatus as recited in claim 1, wherein said first directing means directs a fluid in an amount having a mass in the range of approximately 0.05 to 0.30 of the total mass flowing through said stack.

7. The apparatus as recited in claim 1, wherein said first directing means includes means to cause said fluid flow rate to be at least approximately ten times the flow rate of said off-gas in said off-gas stack.

8. The apparatus as recited in claim 1, wherein said stack is generally cylindrical and has a radius and said second directing means directs said second fluid at an angle with respect to said radius, said angle being approximately 25°.

* * * * *